UNITED STATES PATENT OFFICE.

SAMUEL RIDGWAY KENNEDY, OF PHILADELPHIA, PA., ASSIGNOR TO THE S. R. KENNEDY MANUFACTURING COMPANY, OF CAMDEN, N. J.

COMPOSITION FOR REMOVING HAIR.

SPECIFICATION forming part of Letters Patent No. 330,715, dated November 17, 1885.

Application filed June 24, 1885. Serial No. 169,689. (Specimens.)

*To all whom it may concern:*

Be it known that I, SAMUEL RIDGWAY KENNEDY, of Philadelphia, in the county of Philadelphia, and in the State of Pennsylvania, have invented certain new and useful Improvements in Compositions for Removing Hair; and I do hereby declare that the following is a full, clear, and exact description thereof.

The object of my invention is to provide an improved compound to be used in removing the hair from the face, head, or other parts of the body, which when being used will not injure the skin or destroy the roots of the hair; and to this end it consists in the compound as hereinafter described, and more specifically pointed out in the claims.

Various depilatory substances and compounds have heretofore been known and used, but they have consisted of or contained chemicals injurious to the skin or the roots of the hair, or both, so that they were apt to render the skin upon which they were used sore and sensitive, and to kill the roots of the hair, so as to prevent its growth ever afterward, or to injure such roots so as to diminish or interfere with the subsequent growth of the hair. Unless the skin was naturally hardy or had become hardened, it could not stand the direct application of any of the depilatories heretofore known long enough to allow the hair to be effectually acted upon and removed without being irritated or made sore. The common sulphides, as used heretofore by depilatory manufacturers, have been neither neutral nor acid, but have contained inert matter, which not only discolored the substance, but rendered its use impossible without irritation of the skin. The artificial sulphide of arsenic (orpiment) has been used of late for a depilatory, but is dangerous, as being very irritating and poisonous, and if kept on for a short time it destroys the roots of the hair. This is also true of the sulphohydrates, which have also been somewhat used for depilatories. My compound or composition, however, while as used doing effectually its desired work upon the hair, does not either act upon the skin unpleasantly or irritate it, nor does it injuriously affect the roots of the hair. On the contrary, it is rather emollient, and affects the skin favorably, while it improves and promotes the growth of the hair.

In making my compound I prefer to use the following ingredients substantially in the proportions given: nine parts of sulphur, preferably flowers of sulphur; twelve parts of barium carbonate, ($BaCO$;) twelve parts of sodium carbonate, ($NaCO$;) six parts of zinc oleate; twelve parts of albumen; forty-two parts of starch; seven parts of musk, mixed with perfume to suit. The sulphur and barium carbonate I heat together until they fuse and ignite. In doing this I prefer to heat to a white heat. After such fusing and heating the resultant mass is broken up into small granules of such size as to pass through a No. 30 sieve. The other ingredients as given above, except the albumen and musk, are similarly broken to a size to pass through the same number of sieve. The albumen and musk, perfumed by or mixed with any desired perfumes, as aromatic essential oils, are rubbed up together. The musk and perfumes are not at all necessary to the proper action of the other component parts of the composition. They are merely employed to make the composition more pleasant to use. They can then be put in varied or left out, as desired. Instead of the zinc oleate and albumen, I contemplate using any of their well-known equivalents or substitutes, or any other substance or substances which will act as emollients to the skin, and to protect it and the roots of the hair from the irritating or destructive action of the active parts of the composition. As substitutes for the albumen, I have successfully used gum-arabic, gum-tragacanth, gelatine, gum-mastic, and other gums and resins. As a substitute for the zinc oleate, any of the well-known glycerides can be employed; but I prefer the albumen and the zinc oleate. The starch is used merely to dilute the composition. Instead of that, any other inert matter can be used for the same purpose—as, for instance, magnesia, orris-root pulverized, barium sulphate, or heavy spar pulverized. The actively depilating and essential part of the composition, which I do not desire to change, is the barium polysulphide, prepared, as described, by roasting together barium carbonate and sulphur and the sodium carbonate. The proportions of the various parts can of course be considerably varied without departure from the spirit of my invention. All the substances or ingredients of the composition are mingled together and preferably compressed into tablets of a size just sufficient for a shave. In making these tablets, in order to avoid disturbing the proportions of the ingredients, the dies or molds are each fed from as many separate tubes as there are ingredients. The barium polysulphide obtained as described hereinbefore is free from oxygen, but has a great affinity therefor. The compressed tablets of the composition are covered as soon as made with a protective coating to keep away air and moisture. Such coating can be made of moisture-proof varnish, paraffine-wax, or any soluble varnish adapted to form a film, such as will insure the exclusion of oxidizing elements from the contents of the tablet. As long as the composition is kept from air and moisture it remains inert, and will keep for any length of time without change. When it is to be used to remove the hair from any portion of the body, a tablet is taken and its contents are dissolved in a little warm or cold water, and the solution is applied with a brush made preferably of vegetable fiber, as such resists fully the action of the composition, while a hair or bristle brush would not. As soon as the composition comes into contact with this water it becomes active, so that when the solution is applied to the hair it begins to act at once upon it. This action on the hair takes place down to the skin; but upon the latter the composition, even when in solution, does not act at all. Where the composition is applied to the skin and hair growing thereon as described, not only is there no irritation of the skin from a single application, but repeated and long-continued applications have been found by experience not to render the skin sensitive or sore, but to toughen and improve it. After the composition has remained for two or three minutes applied as described, it is washed off with more water, preferably by means of a sponge. Where it is so washed off, the hair will come away and be removed with it down close to the skin. Upon examination the hair will be found to have been removed as close down to the skin as it could be with a sharp razor.

The composition used as described does not injuriously affect the roots of the hair so as to impair its growth, but its use has been found to rather improve and promote such growth. Said composition has been fully tested for a considerable length of time and on different skins, and it has uniformly been found to be most efficacious in removing the hair, while neither injuring the skin nor roots of the hair, or irritating or making tender the skin. As it is used the solution of the composition appears to begin the destructive action upon the hair above the surface of the skin, which action is quickly completed upon the application of more water in the act of washing off the composition from the face. It is thought that the nascent sulphuric acid in a small quantity generated by the addition of the first small quantity of warm water in which the composition is dissolved is absorbed by the keratin or gelatinous element of the beard, and the affinity of sulphurous or sulphuric acid for water causes the hair-follicles to absorb a large amount of water, which is increased as the application of water in washing takes place, to such an extent that the hair is so softened as to be removed by the sponge, towel, wash-rag, or cloth—that is, the hair is reduced to such a soft gelatinous condition that it comes away under very slight rubbing.

Instead of the carbonate of soda, I can use and contemplate using other of the well-known soluble carbonates.

Having thus described my invention, what I claim is—

1. The composition containing a substance for protecting the skin, substantially such as described, and polysulphide of barium, substantially as set forth.

2. The composition containing one or more emollients, substantially such as described, and polysulphide of barium for acting on the hair, substantially as set forth.

3. The composition for use in removing hair, which contains barium polysulphide, substantially as and for the purpose described.

4. The composition for use in removing hair, containing barium polysulphide and a carbonate, substantially as and for the purpose described.

5. The composition for use in removing the hair, containing barium polysulphide, a carbonate, and one or more emollient substances, substantially as and for the purpose described.

6. The composition for use in removing the hair, containing barium polysulphide, a carbonate, one or more emollient substances, and an inert substance or matter for diluting the composition, substantially as and for the purpose described.

7. The composition for use in removing the hair, containing barium polysulphide, a carbonate, one or more emollient substances adapted to protect the skin from the action of the active part of the composition, an inert substance or matter for diluting the composition, and suitable perfume, substantially as and for the purpose described.

8. The composition for removing the hair, consisting of barium polysulphide, sodium carbonate, zinc oleate, albumen, starch, and suitable perfume, substantially in the proportions specified.

In testimony that I claim the foregoing I have hereunto set my hand this 19th day of June, A. D. 1885.

S. R. KENNEDY.

Witnesses:
GEO. S. PRINDLE,
HENRY C. HAZARD.